Patented Jan. 18, 1938

2,105,728

UNITED STATES PATENT OFFICE 2,105,728

ADHESIVE TAPE

Leon W. Geller, Astoria, N. Y., assignor of two-thirds to Nelson J. Fonarow, New York, N. Y.

No Drawing. Application July 8, 1936,
Serial No. 89,665

9 Claims. (Cl. 154—43)

This invention relates to improvements in adhesive tapes, and more particularly to an improved transparent tape film for use with adhesive tapes.

In my copending application, Serial No. 89,664, concurrently filed herewith, there is described an adhesive tape whose base or backing is a gelatine sheet which can be made to have a desired degree of opacity, color, tenacity, or flexibility. Such a tape can be made to be either of the drying or non-drying type, or a water-soluble or water-insoluble type. As is described more fully in the copending application, supra, the properties of the tape may be improved by mixing the gelatine either before or after hardening with various substances of inorganic or organic origin to give newly acquired qualities.

The present invention provides an improved and stronger transparent base for adhesive tapes than heretofore proposed, by employing superposed layers of transparent cellulosic and transparent gelatinous material. More specifically, the improved base or tape film of the invention comprises a transparent base of vegetable origin, such as Cellophane, joined to a transparent gelatine sheet in any suitable manner, such as by an adhesive, pressure or heat. The adhesive material for the completed tape is, in turn, applied only to the transparent gelatine sheet. If desired, the layer of cellulosic material may be joined on each of its sides to a layer of gelatine, and the adhesive material for the completed tape applied to the outer side of one or both layers of gelatine, depending upon the use for which the tape is required.

Since gelatine sheets are usually brittle, they can be transformed into a very flexible material through the use of plasticizers, such as glycerine, alcohols, soaps, fats, sugar, sulphonated oils, sulphonated fats, borax-shellac solution, aliphatic dihydric alcohols and similar reacting substances. The product so obtained is of superior and satisfactory flexibility and it may be further improved by raising its viscosity through addition of substances like resins, sulphonated fats, sulphonated fatty alcohols and other substances which may produce the same effect upon gelatine. This procedure will produce a more or less transparent material, but in the gelatine, which is ready to be hardened and in which plasticizers have already been introduced, there may also be incorporated other substances for the purpose of changing the appearance or improving the qualities of the original gelatine sheets. Such materials are dyestuffs, resins, waxes, gums, starch, urea, water-soluble gums, glass wool, synthetic tanning substances, perfumes, hydrogenated fats and oils, albumen, casein, tannic acid, cork, sawdust, asbestos, inorganic salts, leather, ammonium stearate, metallic soaps and many other substances. Thus, one may obtain a sheet of various colors, which may be phosphorescent, luminescent, perfumed, of higher tensile strength and which possesses other new and desirable properties.

The gelatine sheets, modified as indicated above, can be made waterproof by treating with solutions of potassium alum, or potassium chromate, or chrom sulphate, or chrom alum, or chrom chloride, or chrom peroxide, or with metallic salts of aluminum, iron, cerium, or by the action of chlorine, or hypochloric acid, or with solution of organic substances, such as of tannic acid, chinon, phenols, naphtols, acetaldehyde, or other aldehydes. The gelatine composition may be hardened by using formaldehyde which is one of the most important hardening agents for gelatine; and which may be brought to act upon the gelatine sheet in vapor form, if desired, mixed with the gelatine mass in the presence of a hardening retarder, such as ammonia, and then cast and heated until hardened.

The adhesive to be applied to the gelatine sheet may be water-soluble or water-insoluble, transparent or opaque, or modified to appear colored or luminescent. Moreover, the adhesive should generally contain plasticizers and hygroscopical substances, and where used to produce a pressure sensitive non-drying adhesive tape should be properly balanced.

For the production of a transparent water-soluble, non-drying or pressure sensitive tape, the gelatine sheet is coated with a water-soluble adhesive, such as water-soluble resins mixed with dihydric aliphatic alcohols, and glue mixed with water-soluble resins and dihydric aliphatic alcohols. Under the term "dihydric aliphatic alcohols", it is understood there fall dibasic alcohols, such as glycol, diethylene glycol, triethylene glycol, di and trimethyl glycol and derivatives such as esters and ethers. These are generally soluble in water and are of a higher hygroscopicity than the trihydric aliphatic alcohols, for example, glycerine. But, in many cases, the glycerine or a mixture of glycerine and dihydric alcohols is more desirable, due to the fact that they are less hygroscopical.

One manner of obtaining a water-soluble adhesive for a non-drying type of tape is as follows: the glue is first soaked in water until it swells, after which it is dissolved by heat in a steam jacketed kettle. To this is added, at a temperature of about 150° F., triethylene glycol, and the mixture stirred until a homogeneous mass is formed. Then a water-soluble adhesive resin is added, which will raise the viscosity of the mass in the same way as sugar will do. An example of the proportions which may be used is:

| | Part |
|---|---|
| Glue | 1 |
| Water | 1 |
| *Dihydric aliphatic* | Parts |
| Alcohols | 2 to 4 |
| Resins | ½ to 1 |

Water-soluble gums, such as tragacanth, acacia, can also be added, or they can be substituted for resin. Other materials, such as triethanolamine, zinc stearate, calcium stearate; other metallic soaps, oils, fats, sulphonated aliphatic high molecular alcohols, can be added with the purpose of balancing the qualities and properties of the adhesive compositions.

For the production of a transparent water-insoluble non-drying tape, the gelatine sheet is coated with a water-insoluble but transparent adhesive, such as adhesive-resins, for example, glyptal resins and vinyl resins. The resins are dissolved in a suitable solvent, and, if necessary, modified by a plasticizer, after which operation they are ready to be applied on the tape.

The rubber adhesives are made from crepe or smoked sheets of rubber and resins or waxes, or with an admixture of both. By heating the rubber with resins and waxes, the rubber depolymerizes and forms adhesives. For the depolymerization of the rubber, there has been used mostly synthetic resins, such as glyptals, urea resins, aldehydes, condensation resins, vinyl resins, although it has been found that the chlorinated wax resins, especially chlorinated paraffin resins, depolymerize rubber easily, forming adhesives of very good qualities. By the term "waxes", I refer especially to all the natural waxes, such as scale paraffin, paraffin, beeswax, candelilla wax, Montan wax, carnauba wax. The chlorparaffin resins are obtained by chlorination of a paraffin solution. These last resins are of various consistency, from balsam-like to very hard, brittle resins, corresponding to the quantity of chlorine introduced in the paraffin. The waxes, it will be understood, of course, can also be chlorinated in the presence of other substances.

In a similar way, the rubber may be depolymerized by waxes, such as carnauba, Montanic, candelilla or synthetic waxes. But, an admixture of resins and waxes, it has been found, gives better results. For this purpose the rubber is depolymerized on a rubber rolling mill or in a mixer to a plastic mass of desired consistency. The amount of resins and waxes necessary for the depolymerization will depend entirely on the quality of the materials and on the depolymerization power of these two depolymerization agents. An example of how this may be done in practice is given merely for the purpose of exposition. In a mixer provided with heat, the rubber sheets are introduced and under good mixing, the rubber is heated until it is soft enough and able to incorporate resins and waxes. These substances are added in small quantities until a sample shows that the depolymerized rubber has the desired adhesive properties. The depolymerized rubber adhesive is then dissolved in benzol or other solvents and is ready for application to the gelatine backing.

Previous to the application of the adhesive, the gelatine sheet may be covered, if required, on the surface to which the adhesive is applied, with a coating of waterproof or solvent-proof material, which will depend on the kind of substances used as adhesives, and also on the degree of desired transparency of the tape. Lacquers of various kinds may be used for this purpose. In case of a transparent tape, it is preferred that the protective layer be a transparent resin, such as glyptal, or chlorinated rubber resin, which may be modified by a plasticizer.

Coatings made from chlorinated naphthalin waxes, especially in admixture with chlorinated rubber resins, serve as a desirable protective coating to be applied on the surface of the tape, which is free of adhesives.

The gelatine sheet may also be hardened by the application of various lacquers, either by spraying the sheet or dipping same in the lacquer, or by using a brush to apply the lacquer, all of course after the sheet has been modified as above stated. Examples of such lacquers are resins dissolved in suitable solvents and suitably modified by plasticizers and other chemicals which may improve the hardness of the gelatine. One may thus also obtain a waterproof, acid-proof and alkaline-proof tape.

What is claimed is:

1. Adhesive tape comprising a sheet of transparent cellulosic material joined to a sheet of transparent gelatinous material, and an adhesive applied to the outer surface of said sheet of gelatinous material.

2. Adhesive tape comprising a sheet of Cellophane joined to a sheet of transparent gelatine, and an adhesive applied to the outer side of said sheet of gelatine.

3. Adhesive tape comprising a sheet of transparent cellulosic material, a sheet of transparent gelatinous material joined to each side of said first sheet, and an adhesive applied to the outer side of at least one of said gelatinous sheets.

4. Adhesive tape comprising a sheet of transparent cellulosic material joined to a sheet of transparent gelatinous material, a priming coating in the form of a waterproof lacquer applied to the outer surface of said sheet of gelatinous material, and an adhesive applied to said lacquer.

5. A non-drying adhesive tape comprising a backing made of a sheet of transparent cellulose material joined to a sheet of gelatinous material, and a water-soluble adhesive applied to the outer side of said gelatinous material.

6. A non-drying adhesive tape comprising a backing made of a sheet of transparent cellulose material joined to a sheet of gelatinous material, and a water-insoluble transparent resin adhesive applied to the outer side of said backing.

7. A non-drying adhesive tape comprising a sheet of transparent cellulose material joined to a sheet of gelatinous material, and depolymerized rubber adhesive applied to one of the outer sides of said sheet of gelatinous material.

8. Adhesive tape comprising a backing made from a sheet of cellulosic material and a superposed sheet of gelatinous material, an adhesive applied to the outer surface of said sheet of gelatinous material, and a protective coating of wax and chlorinated rubber applied to the surface of said backing which is free from said adhesive.

9. A tape in accordance with claim 8, including a primary coating in the form of a solvent-proof lacquer applied to said outer surface of said sheet of gelatinous material, between said surface and said adhesive.

LEON W. GELLER.